(12) United States Patent
Raper et al.

(10) Patent No.: US 6,968,907 B1
(45) Date of Patent: Nov. 29, 2005

(54) SMOOTH ROLLING COVER CROP ROLLER

(75) Inventors: Randy L. Raper, Auburn, AL (US); Petru-Aurelian Simionescu, Auburn, AL (US)

(73) Assignees: The United States of America as represented by the Secretary of Agriculture, Washington, DC (US); Auburn University, AL (US)

( * ) Notice: Subject to any disclaimer, the term of this patent is extended or adjusted under 35 U.S.C. 154(b) by 15 days.

(21) Appl. No.: 10/747,459

(22) Filed: Dec. 29, 2003

(51) Int. Cl.⁷ ............................................ A01B 49/04
(52) U.S. Cl. .................................................. 172/518
(58) Field of Search .................. 172/21, 174, 176, 172/177, 240, 322, 452, 518, 540, 542, 548, 172/556, 118–122

(56) References Cited

U.S. PATENT DOCUMENTS

| | | | |
|---|---|---|---|
| 4,006,781 A | | 2/1977 | van der Lely et al. |
| 4,193,457 A | * | 3/1980 | Sphar ......................... 172/810 |
| 4,263,974 A | | 4/1981 | Van der Lely |
| 4,324,295 A | | 4/1982 | Weichel |
| 4,339,908 A | * | 7/1982 | Johnson ........................ 56/503 |
| 4,389,799 A | * | 6/1983 | Norton et al. ............... 404/128 |
| 4,907,652 A | | 3/1990 | Henry et al. |

(Continued)

OTHER PUBLICATIONS

R.L. Raper et al., Cover Crop Rollers: A New Component of Conservation Tillage Systems. An ASAE Meeting Presentation, Paper No. 031020, Jul. 27-30, 2003, The Society for engineering in agricultural, food and biological systems, pp. 1-11.

Sustainable Farming Connection, Transplanter and Stalk-Chopper Modifications, Custpmized tools handle heavy cover crop residue, Revised Oct. 3, 1998, http://www.ibiblio.org/farming-connecton-covercro/groff/equip.htm, pp. 1-2.

Laura Sayre, The New Farm, Introducing a Cover Crop Roller without all the Drawbacks of a Stalk Chopper, http://www.newfarm.org/depts/NFfield_trials/1103/notillroller.shtml, Nov. 20, 2003, pp. 1-5.

Matthew Ryan, The New Farm, Rye Lessons Learned here at the Rodale Institute, http://www.newfarm.org/features/0903/Inst_rye.shtml Sep. 12, 2003, pp. 1-2.

Remlinger, Double Roller Harrow, http://www.remlingermfg.com/ag_products/agprod17.htm Apr. 15, 2002.

Preston Sullivan, Overview of Cover Crops and Green Manures, Appropriate Technology Transfer for Rural Areas, http://attra.ncat.org/attra-pub/covercrop.html, Jul. 2003, pp. 1-18.

Kelley Manufacturing Co., Cover Crop Roller, www.kelleymfg.com, pp. 1-2, no date.

USDA, National Sedimentation Laboratory, Upland Erosion Processes Research Unit Managing Cover Crops, http://sedlab.olemiss.edu/uep_unit/projects/cover_crops/index25.html pp., 1-3, no date.

*Primary Examiner*—Robert E Pezzuto
(74) *Attorney, Agent, or Firm*—John D. Fado; Randall E. Deck; Lesley Shaw

(57) ABSTRACT

Cover crops may be rolled and crimped using an apparatus which may be rolled across a field at a relatively high speed without excessive vibration. The apparatus includes a substantially cylindrical drum which has a plurality of rows of outwardly extending blades projecting therefrom. The blades may be wave-shaped, curved, substantially straight and discontinuous, blades paired with a plurality of spaced apart outwardly extending rings, or combinations thereof. In use as the apparatus is rolled across a field having a crop thereon, the blades contact and crimp the stalks of the crop, effectively killing the plant.

21 Claims, 11 Drawing Sheets

U.S. PATENT DOCUMENTS

| | | |
|---|---|---|
| 4,919,211 A | 4/1990 | Cope |
| RE33,312 E * | 8/1990 | Elliot .......................... 404/124 |
| 5,474,135 A * | 12/1995 | Schlagel ..................... 172/151 |
| 6,068,061 A * | 5/2000 | Smith et al. ................. 172/139 |
| 6,494,270 B1 * | 12/2002 | Lawson ....................... 172/554 |
| 6,539,697 B2 * | 4/2003 | Burk ............................ 56/504 |

* cited by examiner

SMOOTH ROLLING COVER CROP ROLLER

BACKGROUND OF THE INVENTION

1. Field of the Invention

The invention relates to a novel apparatus and method for killing a cover crop by rolling and crimping.

2. Description of the Prior Art

Between 1990 and 2002, the number of U.S. cropland acres planted without tillage increased from 73.2 million acres to 103.1 million acres (CTIC, 2003). The use of cover crops has contributed to the overall success of conservation systems for many producers. Cover crops are increasingly being used to protect the soil from erosion during winter months, to enhance filtration and storage of winter rainfall, and reduce the negative effects of soil compaction (Reeves, 1994; Raper et al., 2000a; Raper et al., 2000b). Cover crops also increase the buildup of organic matter in the soil which leads to improved soil structure.

In this practice, the cover crop should be terminated prior to planting the cash crop to prevent the cover crop from using valuable spring moisture that could be used by the main cash crop after it has been planted. Several methods have been used for this purpose with the most common being the use of chemicals. This option is relatively fast and inexpensive and has quickly become the method of choice. However, planting after a chemical kill can sometimes be difficult if the cover crop has been allowed to become too large and lodged in multiple directions. This may hamper the ability of a planter with conservation tillage attachments from being successful in moving or cutting the residue and placing the seed in a proper soil furrow.

Another method that has often been used to terminate the cover crop is mowing. This option may also pose problems because cover crops can sometimes re-sprout and compete with the cash crop for available moisture and nutrients. Also, the unattached crop residue can make the planting operation difficult as row cleaners can become clogged with loose residue and require frequent cleaning.

Flattening and crimping cover crops is widely used in South America as a means to kill cover crops, and this practice is receiving increasing interest in North America. Implements for this purpose are usually round drums with attached blunt blades. As the device is rolled across the field, the blades crimp or crush the stalks of the cover crop, causing death of the plants. In this method, the purpose of the blades is to crimp or crush the stems of the cover crops and not cut them. If the stems are cut, the cover crops can re-sprout.

There are multiple benefits of rolling a cover crop (Ashford and Reeves, 2003). When the operation is conducted at the correct stage of plant growth, the roller is equally effective as chemicals at terminating the cover crop. Further, the energy required for rolling is significantly reduced from that of mowing, perhaps even as much as tenfold. Finally, a flat mat of cover crop is created that lays in the direction of travel. Producers using planters operating parallel or slightly off parallel to this direction have been very successful in obtaining proper plant establishment.

Despite these advances, some North American producers have reported problems with these machines when they have attempted to create or use rollers similar to those used in South America. The primary complaint has been the excessive vibration that the rollers transmit to the tractor. The most effective method of alleviating the vibration has been to reduce travel speed. However, most producers have found this to be an unacceptable solution, because at these low speeds the time needed to roll a large field is significantly greater than the time required to treat the same field with chemical sprays. For these and other reasons the need remains for an improved apparatus and method for rolling and crimping cover crops.

SUMMARY OF THE INVENTION

We have now invented an improved apparatus and method for rolling and crimping cover crops. The apparatus includes a substantially cylindrical drum which has a plurality of rows of outwardly extending blades projecting therefrom. The blades may be wave-shaped, curved, substantially straight and discontinuous, blades paired with a plurality of spaced apart outwardly extending rings, or combinations thereof. During use, as the apparatus is rolled across a field having a crop thereon, the blades contact and crimp the stalks of the crop, effectively causing the plants to die.

In accordance with this discovery, it is an object of this invention to provide an improved apparatus and method for killing cover crops by rolling and crimping.

Another object of this invention to provide an improved apparatus and method for rolling and crimping cover crops without excessive vibration as the apparatus is rolled across a field at a relatively high speed.

Yet another object of this invention to provide an improved apparatus and method for killing cover crops without the use of chemicals or herbicides.

Other objects and advantages of this invention will become readily apparent from the ensuing disclosure.

DETAILED DESCRIPTION OF THE INVENTION

Figure 1:
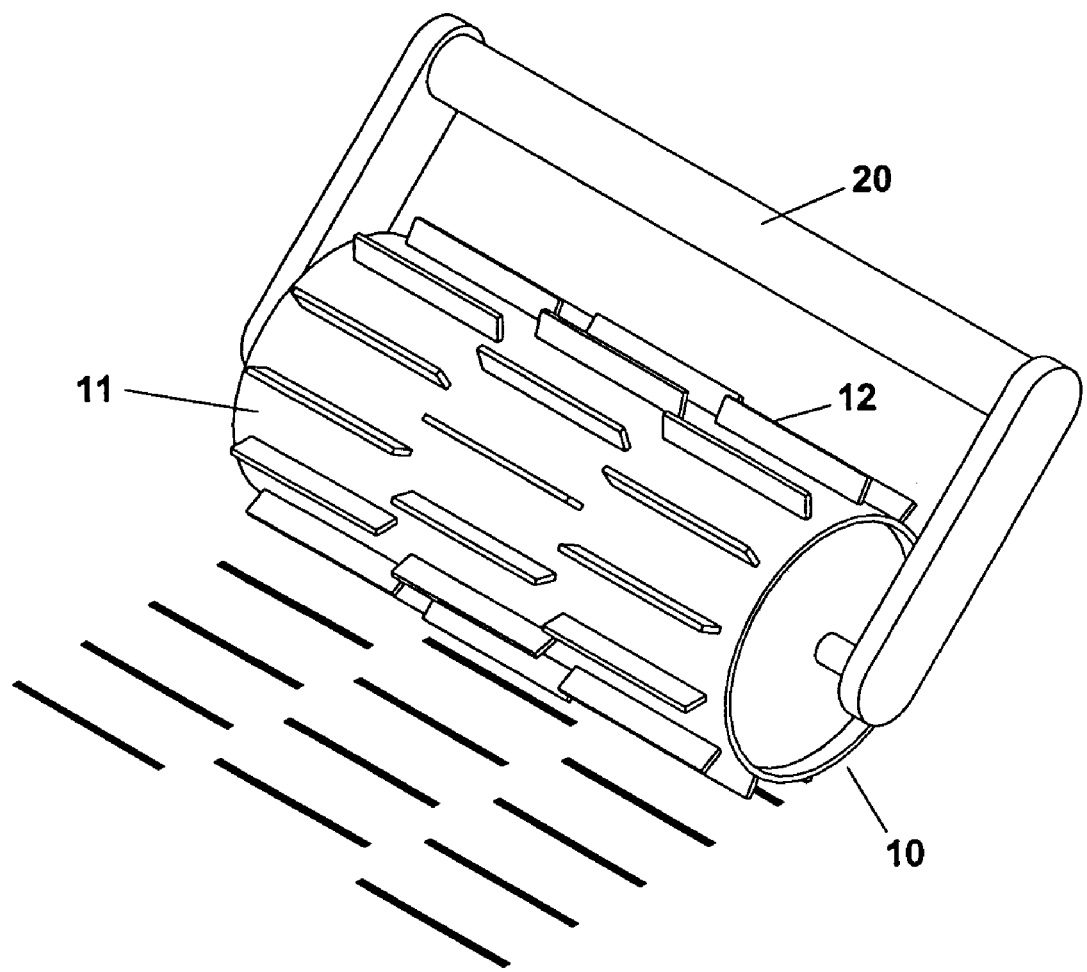
FIG. 1 shows a perspective view of an apparatus having offset rows of straight, discontinuous blades.

Referring now to FIG. 1, the apparatus 10 includes a rotating substantially cylindrical drum 11, which is disposed to roll across the surface of a field to be treated. As defined herein, a substantially cylindrical drum includes cylinders having a circular cross-section (taken normal to the axis) as well as cylinders having polygonal cross-sect-ions with greater than or equal to 6 sides. Although cylinders having polygonal cross-sections with fewer sides could be utilized, the apparatus would be subject to excessive vibration as it rolled over an agricultural field. The cylinder may be constructed as a single unit (unitary) or it may be constructed from two or more shorter, coaxial cylinders joined together. In this latter embodiment, each segment may have the same or different blade patterns as described hereinbelow. Extending outwardly from the outer periphery of the drum are a plurality of rows of blades 12 which are effective for contacting and crimping or crushing the stalks of the cover crops as the apparatus is rolled across a field. The blades may be permanently fixed to the cylinder, such as by welding, or, for greater flexibility, they may be detachably connected, such as with bolts.

Figure 2:
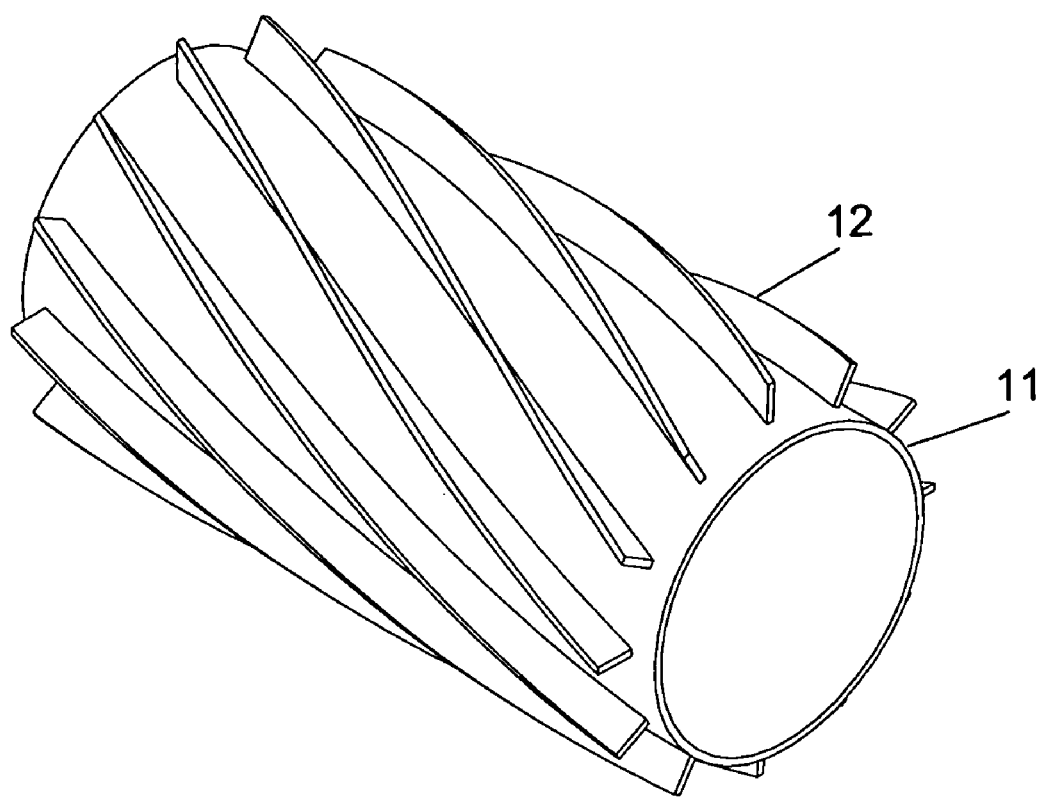
FIG. 2 shows a perspective view of an apparatus having curved blades.
Figure 3:
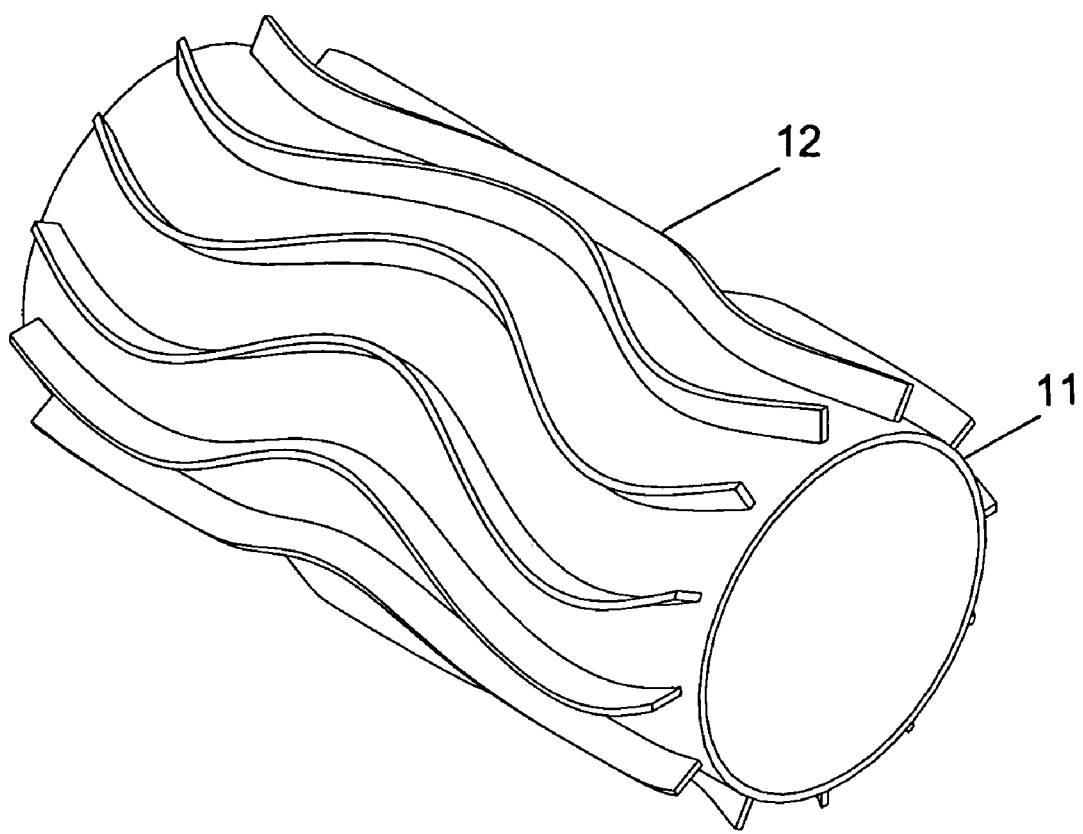
FIG. 3 shows a perspective view of an apparatus having sine wave shaped blades.
Figure 4:
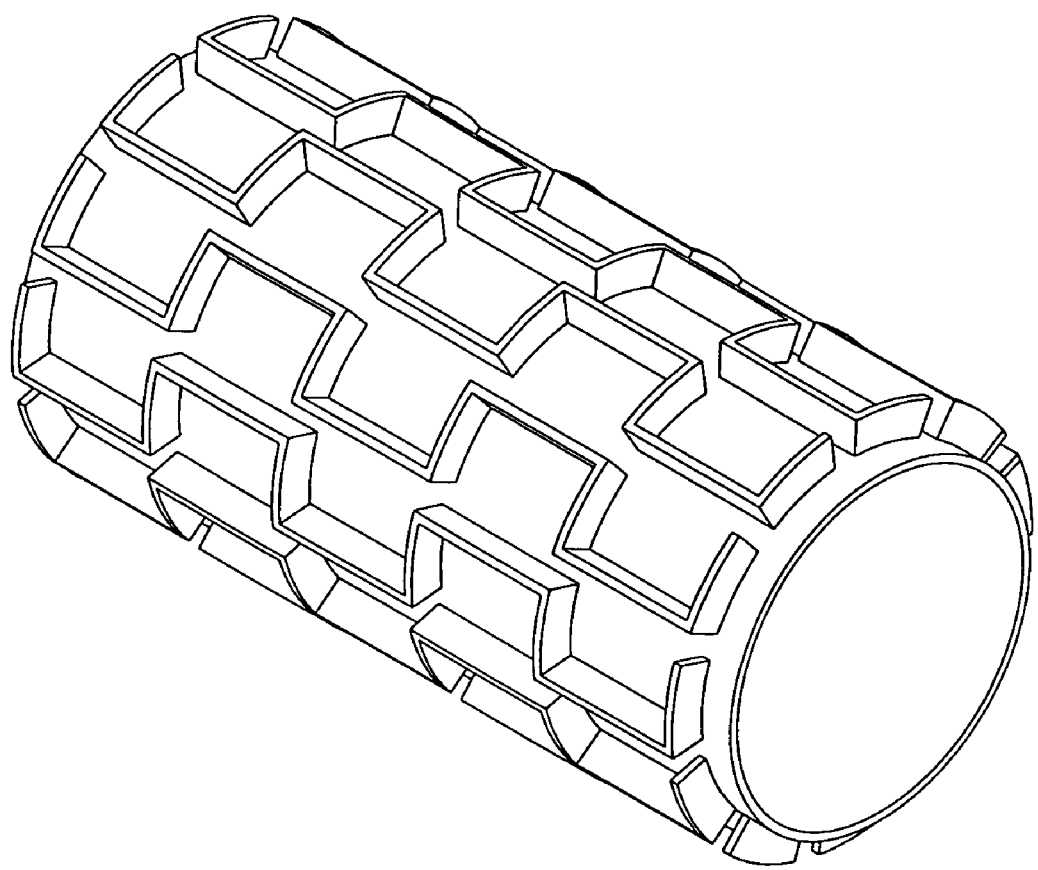
FIG. 4 shows a perspective view of an apparatus having square wave shaped blades.
Figure 5:
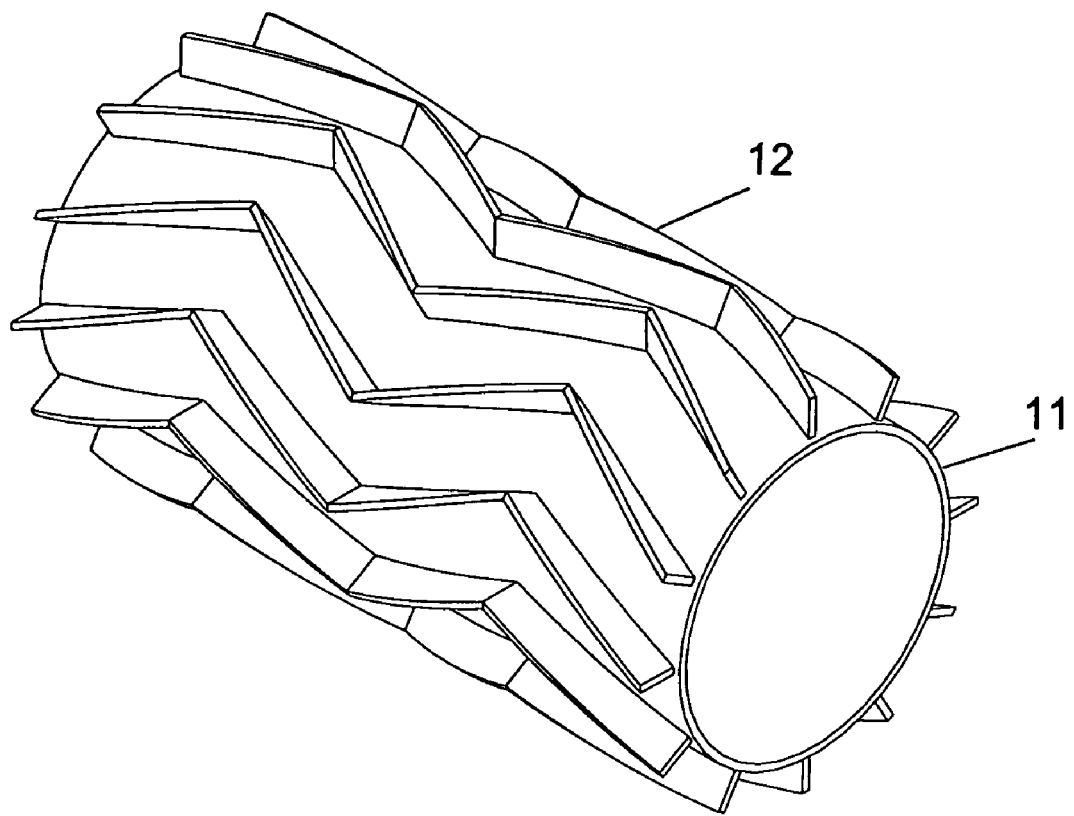
FIG. 5 shows a perspective view of an apparatus having triangular wave shaped blades.

In accordance with this invention, blades 12 are adapted to minimize the vibration of the apparatus as it is rolled across the field. To this end, suitable blades may be wave shaped, curved, or substantially straight and discontinuous, or blades may be paired with a plurality of spaced apart outwardly extending rings, or any of these configurations may be combined. In a first preferred embodiment shown in FIG. 2, the blades 12 are curved, and include both helical and coil shaped blades. As used herein, coil-shaped is defined as a curve traced on the cylinder 11 by the rotation of a point crossing its right section at a variable oblique angle, which oblique angle is further defined as the angle θ between the coil and a line on the surface of the cylinder parallel to the cylinder axis at that point (see FIG. 8a). While the angle θ may vary along the course of a coil shaped blade, the skilled practitioner will recognize that the definition of a helical blade is the same except that the angle θ is constant. The actual angle θ may differ with the length of the cylinder 11, its diameter, and the number of blades. In general, each curved blade 12 will extend at least approximately 20° around the circumference of cylinder 11, preferably at least 60° about the circumference. Although there is no upper limit on the number of turns that a blade may make around the cylinder, in practice, the blades will generally not extend more than approximately 360° about the circumference (one complete turn). Without being limited thereto, suitable angles θ will typically be greater than or equal to about 5°, preferably greater than or equal to about 10°, and most preferably greater than or equal to about 20°; suitable angles θ will typically be less than or equal to about 60°, preferably less than or equal to about 50°, and most preferably less than or equal to about 40°. Although the curved blades are preferably unbroken or continuous, they may also be interrupted, with intervening gaps or breaks along the length of the curve.

In a first alternative embodiment, blades 12 may also be wave-shaped or undulating. A variety of wave shapes are suitable for use herein, and include but are not limited to sine waves (sinusoidal), square waves, triangular, and saw-tooth waves, such as shown in FIGS. 3–6. Moreover, the amplitude, wavelength and symmetry of the waves may be constant or variable. As with the curved blades, the wave shaped blades 12 may also be unbroken or interrupted (as shown in the figures). For example, discontinuous triangular or saw-tooth waves may also be referred to as "herringbone" shaped, while discontinuous sine waves may have the appearance of alternating convex and concave curves.

In a second, alternative embodiment shown in FIG. 1, the blades 12 may be substantially straight, discontinuous blades, defined herein as blades substantially parallel to the axis of the cylinder 12 and extending less than about 80% of the length of the cylinder (i.e., the total sum of each segment on a row). In this embodiment, each succeeding row of blades is preferably offset from the immediately preceding and following rows of blades such that areas of continuity and discontinuity are not aligned (with respect to a cross-sectional plane at a right angle through the cylinder). Finally, it is also understood that any combination of the above-mentioned curved, wave-shaped and straight, discontinuous blades may be used as well.

Figure 7:
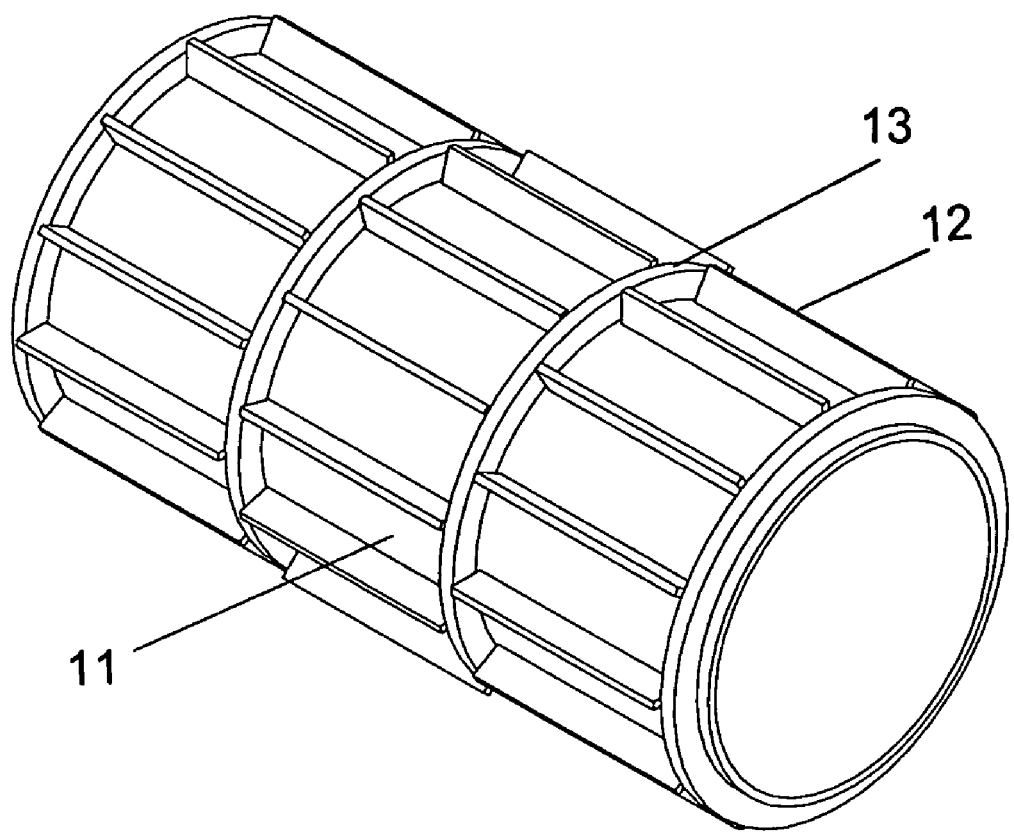
FIG. 7 shows a perspective view of an apparatus having rows of blades paired with outwardly extending rings.

A third alternative embodiment is presented in FIG. 7, wherein a plurality of blades are paired with a plurality of spaced apart outwardly extending rings 13. In this embodiment, at least two rings 13 should be positioned adjacent (i.e., at or near) the opposite ends of the cylinder 11. One, two or more additional rings 13 are also preferably positioned spaced apart from one another and intermediate the ends as shown. The shape of the blades is not critical, and any of the above-mentioned blades may be used herein. Moreover, in this embodiment, suitable blades also include substantially straight, continuous blades, defined herein as blades substantially parallel to the axis of cylinder 12 and extending greater than about 90% of the length of the cylinder. Each blade row may be constructed as a single unitary blade with ring segments or arches interposed between consecutive blades, or the rings may be of unitary construction with the blade 12 segmented and extending between consecutive rings. To minimize vibration during operation while still allowing contact of the blades 12 with the cover crop, the height of the rings (that is, the distance the rings extend radially outwardly from the outer periphery of the cylinder to their outer edge) should be approximately equal to the height of the blades 12. The rings 13 may be circular as shown with the plane of the ring normal to the axis of the cylinder, or elliptical, with the plane not at a right angle to the axis.

The spacing between adjacent rows of the blades 12 is somewhat variable, but should be selected that it is small enough that the apparatus does not vibrate excessively as it is rolled across a field, but should be large enough that the outer edges 14 of the blades apply sufficient pressure to permanently crimp or crush the stalk. For optimal efficacy, the apparatus should be constructed to apply a force of greater than or equal to about 50 pounds per square inch to the stalk of a contacted plant at the point of contact with a blade. Although higher forces may be used, and forces as high as 100 psi have been found to be suitable and may even be preferred for use on fields with soft soil, the pressure should not be so great as to sever the stalks. Thus, if the blades are positioned too close together, they may not exert sufficient pressure to crimp the stalks as the apparatus rolls over the crop. Although the pressure exerted by the blades upon the stalks is obviously a function of the mass of the apparatus (or externally applied pressure), and a small blade spacing can be utilized by increasing the mass of the apparatus (or externally applied pressure), the skilled practitioner will recognize that application of very high weights or pressure may decrease economy of operation. The optimal spacing for any particular design may be readily determined by routine testing.

Figure 8:
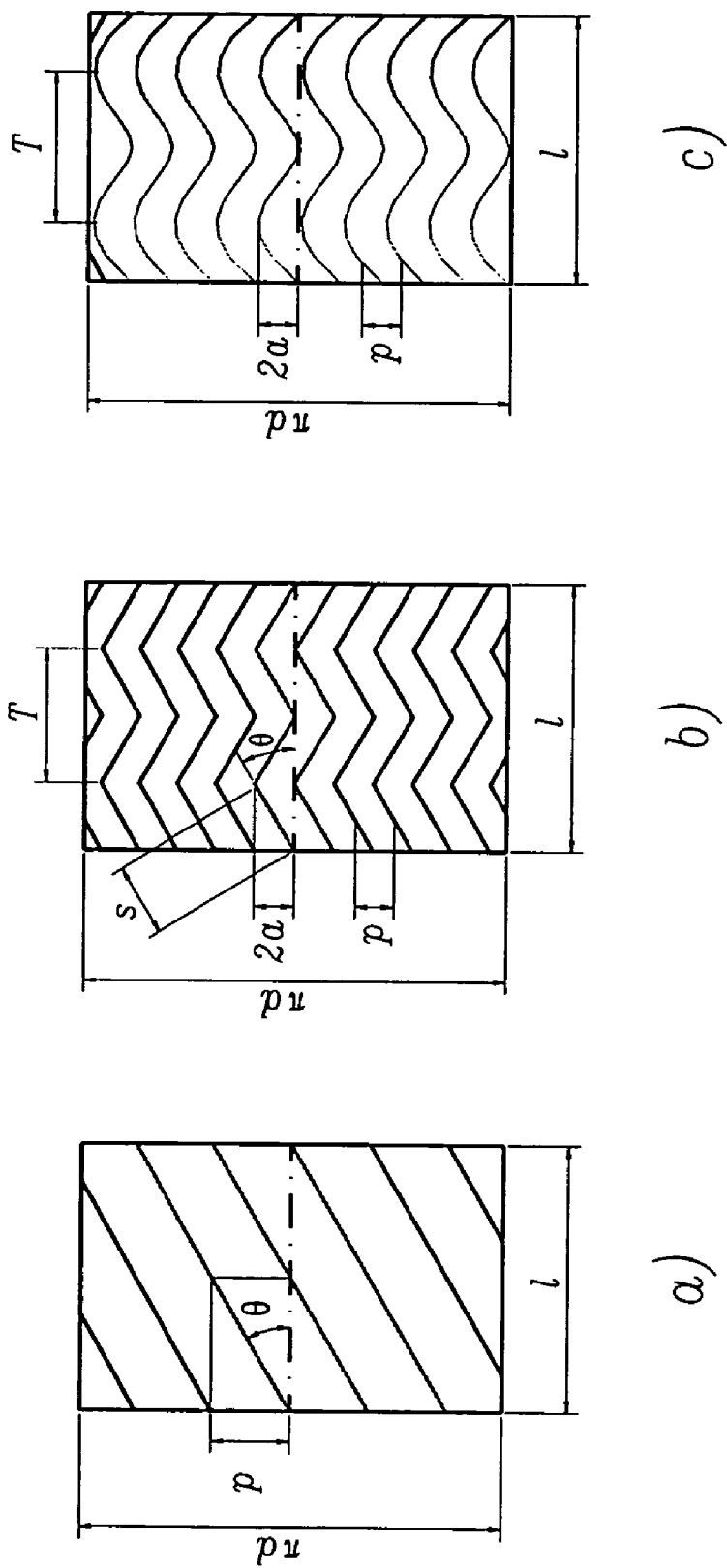
FIG. 8 shows the profiles for helical (FIG. 8a), triangular (FIG. 8b), and sinusoidal (FIG. 8c) blades.

To minimize vibration, the spacing between consecutive rows of blades should be sufficiently small that when the device 10 is laid on a hard, flat, horizontal surface, the outer edges of consecutive rows of blades 12 should contact surface (in a plane normal to the axis of cylinder 11). The cylinder 11 should preferably be elevated by the blades such that the outer periphery thereof does not contact the surface. While the maximum spacing between consecutive rows of blades (and hence the minimum number of rows of blades) that ensures a low vibration level may be readily determined by routine testing, the maximum spacing for curved and wave shaped blades may also be determined theoretically as follows: To minimize vibration, the spacing between consecutive rows of blades should be such that when the device 10 is rolled on a hard, flat, horizontal surface, the outer edges of the same or consecutive rows of blades 12 should contact the said surface in at least two points, while the center of gravity of the roller always projects in-between these contact points. It is understood that the cylinder 11 remains elevated by the blades such that the outer periphery thereof does not contact the surface. As shown in FIG. 8, for helical blades this condition translates into: (the first equation follows):

$$\tan \theta \approx p/(l/2) = (\pi d/n)/(l/2)$$

and thus $$n \geq 2\pi d/(l \cdot \tan \theta).$$

For triangular wave shaped blades having at least two periods T:

$$p \leq 2a$$

and thus $$n \geq \pi d/(2s \cdot \sin \theta).$$

For sinusoidal blades having at least two periods T:

$$p \leq a$$

and thus $$n \geq \pi d/a.$$

Wherein l and d represent the length and diameter of the device measured over the top of the blades, $\theta$ is the helix angle for the helical and triangular blades, $p = \pi d/n$ is the blade pitch (the spacing measured along the outer periphery of the blades in a plane perpendicular to the cylinder axis for equally spaced, identical blades), a is the amplitude and T is the period of the wave shaped blades, and s is length measured between 2 vertices on the top of a triangular blade.

Without being limited thereto, we have found that for devices constructed from typical heavy gauge steel or iron, a spacing between approximately 4 to 12 inches (measured along the outer periphery or diameter of the cylindrical drum 11 or pitch p for cured blades) allows the device to be operated at speeds of 6 miles per hour or more in a field, without excessive vibration, while providing sufficient pressure to crimp the stalks of the cover crops, and is therefore preferred. The outer edges of the blades 12 are preferably blunt to minimize severing the stalk. The size of the drum 11 and its material of construction are not critical, and may be selected by the user, although drums constructed from steel or iron and having diameters between approximately 12 and 36 inches and lengths between approximately 35 and 90 inches are generally preferred. The surface or face of the drum may be open (e.g., a cage) or solid (closed). The number of rows of blades 12 will vary with the diameter of the cylindrical drum 11 and the spacing between blades as described above.

The apparatus is constructed as a field-going machine including a ground-traversing carriage or frame 20, for carrying above-mentioned drum 11. The frame may be attached to any existing field going machine, such as a tractor, with a hitching means. In an alternative embodiment, the apparatus may be constructed as part of a self-propelled, wheeled or tracked machine having its own power source or engine. In this embodiment the practitioner skilled in the art will recognize that the apparatus should include suitable drive belts, gears or other conventional drive mechanisms for connection between the power source and the moving components.

The apparatus may be used for killing a cover crop such as prior to planting a desired cash crop. The time of use may be readily selected by the user, although optimal kill levels are achieved after the cover crop has matured and has a low moisture content, preferably at its soft-dough stage. At this stage, kill rates well over 90% may be achieved. The apparatus may also be used to roll and kill cover crops at earlier stages, such as at the anthesis stage or the flag-leaf stage, although kill rates are significantly reduced, particularly for the earlier flag-leaf stage. In all of these applications, the apparatus is simply rolled over a cover crop. As noted above, in some instances such as the treatment of cover crops on soft-soiled fields, the mass of the apparatus may be increased by application of additional weights, or external pressure may be applied, to apply sufficient pressure to crimp the stalks. The apparatus may be used for rolling and killing a variety of cover crops, but is preferably used for the treatment of grasses, including but not limited to, sorghum sudan-grass, rye, and wheat.

The following examples are intended only to further illustrate the invention and are not intended to limit the scope of the subject matter which is defined by the claims.

EXAMPLE 1

To enhance our understanding of the rolling/crimping process, a series of three experiments were carried out. For the first experiment, an existing prototype roller was used. This roller was a small section of a three-piece roller assembly constructed by Bigham Brothers, Inc. (Lubbock, Tex.). The small roller (1.14 m width×0.41 m diameter) was removed from the larger implement and placed on a category 1 toolbar (ASAE, 1998). A weight bracket was added to the implement so that the amount of weight could be varied.

The blades on the roller were straight blades of 6.4 mm thickness and 0.10 m height extending across the full length of the roller drum, and were rigidly attached to the roller drum at seven different locations around the drum with a uniform circumferential spacing of 0.18 m. These blades were blunt and were not designed to cut the cover crop, rather they were designed to crimp it and leave it intact. Between the blades, 8.8 cm angle iron was welded onto the roller to limit the amount of vertical movement of the roller and reduce vibration. The vertical height of this angle iron as it was welded was 5.7 cm.

The first experiment investigated the amount of pressure that was required kill a cover crop. To obtain various pressures on the blades, different amounts of weight were attached to the weight bracket. The overall weight of the roller was 445 kg. Assuming that all of the weight of the roller was suspended over a single blade, the maximum pressure exerted by the roller was 0.61 MPa with no weight attachments. This pressure is slightly higher than the 0.44 MPa blade pressure used by Ashford and Reeves (2002) for their roller. Attaching the weight bracket (45 kg) and including two additional weights (90 kg) results in increasing the pressure to 0.80 MPa. Adding four more weights (180 kg) to the machine results in a third pressure of 1.05 MPa.

This experiment was conducted in the outdoor soil bins of the USDA-ARS National Soil Dynamics Laboratory (NSDL) in Auburn, Ala. on a Vaiden silty clay soil (thermic Aquic Dystruderts) and a Hiwassee clay soil (thermic typic Rhodudults). The roller was attached to a soil bin car which only allowed the roller to contact the cover crop or soil. Travel speed was kept constant at approximately 1.1 m/s.

A cover crop of rye (*Secale cereale* L.) was grown during winter months of 2001 and spring months of 2002 for testing in these two soil bins. The experiment was conducted in early April 2002 when the cover crop was in the soft dough growth stage (Nelson et al., 1995). Measurements of cover crop biomass were taken on a 0.25-m$^2$ area.

A completely randomized block experiment was conducted with three replications. Three different treatments of applied pressure of 0.61 MPa, 0.80 MPa, or 1.05 MPa were used. The tractor and roller were used in three different lanes in the soil bin with each plot being approximately 1.14 m wide (the width of the roller)×20 m long.

Measurements of the indentation into the soil by the blades from the roller were made on bare areas of the soil with a ruler. Percent kill measurements obtained by each treatment were made on a weekly basis for four consecutive weeks and compared to a control plot which was not rolled. Percent kill measurements were obtained by using a visual rating system on a 0–100 scale with 0 being no kill and 100 being complete kill.

Cone index and soil moisture were measured immediately after the conclusion of the roller experiment. Cone index was measured on the soil bins with a Rimik (Toowoomba, Australia) hand-held soil cone penetrometer (ASAE, 1999a; ASAE, 1999b). Volumetric soil moisture was also measured in the 0–15 cm depth range using a time-domain reflectometry probe.

Results and Discussion

The rye cover crop produced 8040 kg/ha of dry biomass on the Vaiden silty clay soil and 6471 kg/ha on the Hiwassee clay soil. The volumetric soil water was found to be 26.8% in the 0–15 cm range for the Vaiden silty clay soil and 21.1% for the Hiwassee clay soil for this same depth range. The soil strength of the Hiwassee soil was greater than the Vaiden soil throughout the entire soil profile even though neither exhibited signs of root-limiting levels of soil compaction (FIG. 7).

Analyzing the indentations made by the roller on the soil surface showed a significant effect of soil type (FIG. 8). Statistically significant higher indentations were made in the Vaiden soil as compared to the Hiwassee soil. For the Vaiden soil, 1.05 MPa caused indentations of 13 mm, 0.80 MPa caused indentations of 8 mm, and 0.61 MPa caused indentations of 6 mm. For the Hiwassee soil, 1.05 MPa caused indentations of 11 mm, 0.80 MPa caused indentations of 9 mm, and 0.61 MPa caused indentations of 5 mm.

After the cover crop had been rolled down one week, only about 5% of the cover crop had been killed by the use of the roller (Table 1). A statistically significant increase (but not biologically or practically important) was found on the Hiwassee clay soil with the two larger pressures (0.80 MPa and 1.05 MPa) having 6% kills and the lesser pressure of 0.61 MPa having only a 4.8% kill. After the second week, the percent kill values had increased to almost 30% for the two higher pressures in the Hiwassee clay causing a statistically higher value of 28.8% as compared to the lower pressure having a 23.2% kill. The third week of readings found the largest increase in percent cover crop kill with all values going up over 60%. No differences were found during this week's readings. Only a slight numeric increase in percent kill was found by waiting until the fourth week of the readings as most plants had died by this time.

TABLE 1

Percent kill for the rye cover crop for Experiment 1.

| | % Cover Crop Kill | | | | | | | |
|---|---|---|---|---|---|---|---|---|
| | Vaiden silty clay soil | | | | Hiwassee clay soil | | | |
| | 0.61 MPa | 0.80 MPa | 1.05 MPa | LSD$_{(0.10)}$ | 0.61 MPa | 0.80 MPa | 1.05 MPa | LSD$_{(0.10)}$ |
| Week I | 5.5 | 5.5 | 6.2 | ns* | 4.8 b | 6.0 a | 6.0 a | 0.89 |
| Week II | 27.0 | 28.2 | 30.2 | ns | 23.2 b | 28.8 a | 28.8 a | 4.17 |
| Week III | 63.0 | 62.8 | 68.8 | ns | 66.2 | 66.8 | 71.0 | ns |
| Week IV | 64.5 | 67.5 | 63.5 | ns | 75.0 | 71.2 | 73.8 | ns |

*ns indicates lack of statistical significance at the 0.10 level.

The results from this experiment indicate that the pressure necessary to crimp or crush a rye cover crop was not significantly important in the range tested. All of the pressures tested (from 0.61 MPa to 1.05 MPa) were equally able to kill the rye cover crop after a three- to four-week period. These results correlate well with Ashford and Reeves (2003) which found that cover crop growth stage was the most important factor in determining the effectiveness of various methods of killing cover crops.

EXAMPLE 2

A second experiment was conducted to evaluate different blade systems in soil bins. For both the second and third experiments, an experimental roller was designed and manufactured that had the capability of using three different blade systems described below. This implement had a diameter of 0.41 m, a width of 0.91 m, and weighed 341 kg. It was mounted on a category 1 toolbar. This toolbar was mounted on a soil bin car which allowed only the roller to touch the cover crop or soil. The roller was operated at a speed of approximately 1.3 m/s.

The second experiment consisted of evaluating three different blade types and determining their different vibration characteristics and their crimping capability. The blades were all of 5 cm height and 6.4 mm thickness. This experiment was also conducted in the two outdoor soil bins of the NSDL in a Vaiden silty clay soil and a Hiwassee sandy loam soil.

To expedite the experiments, a sorghum-sudan grass (*Sorghum bicolor*, (L.) Moench) cover crop was grown during the summer months of 2002 and used for the next experiment. Tests were conducted during August 2002, when the sorghum-sudan grass was in growth stage 3 (Vanderlip and Reeves, 1972). The cover crop was killed when the sorghum-sudan grass cover crop was in a much earlier crop growth stage than the rye in Experiment 1 due to our need to plant our normal winter cover crops for future experiments. Measurements of cover crop kill were made on a weekly basis for three consecutive weeks. Measurements of cover crop biomass were taken on a 0.25-m² area.

A completely randomized block experiment was conducted with three replications. Three different treatments of various blade systems were used: (1) long-straight blades across the entire length of the roller drum, (2) short-staggered straight blades, and (3) curved blades. A unique feature was incorporated into the manufacture of the roller that allowed any of these blade arrangements to be mounted using bolts to threaded sections of the drum. The roller was used in three different lanes in the soil bin with each plot being approximately 0.91 m wide (the width of the roller) ×20 m long. The maximum pressures applied by the roller (0.64 MPa) were similar to those applied by the roller used in Experiment 1 when treatment 1 was conducted (0.61 MPa with straight long blades).

Vibration data was obtained with a Quest Technologies (Oconomowoc, Wis.) VI-100 Vibration Meter. The vibration sensor was mounted on the frame of the experimental roller perpendicular to the measuring surface to give a vertical acceleration. Seven observations were read from the digital display and were manually recorded for each plot. Acceleration data (m/s²) was reported in root-mean-square (RMS) values, which is 0.707 of the peak-to-peak acceleration.

Results and Discussion

Greatly reduced masses of sorghum-sudan grass cover crop were grown during the summer months of 2002 as compared to the previous winter's rye cover crop. The sorghum-sudan grass cover crop grown on the Vaiden silty clay soil produced 2526 kg/ha while it produced 3862 kg/ha on the Hiwassee sandy loam soil. The volumetric soil water was found to be 21.0% in the 0–15 cm range for the Vaiden silty clay soil and 7.7% for the Hiwassee sandy loam soil for this same depth range.

The percent kill values measured each week were reduced throughout the experiment as compared to those measured in Experiment 1. These small percentages of kill were not unanticipated due to the early growth stage of the cover crop. No measurements could be made on Week I due to inclement weather. For every other week of the experiment, no differences were found between the three different blade systems used on the roller.

TABLE 2

Percent kill for the sorghum-sudan grass cover crop for Experiment 2.

| | % Cover Crop Kill | | | | | | | |
|---|---|---|---|---|---|---|---|---|
| | Vaiden silty clay soil | | | | Hiwassee sandy loam soil | | | |
| | Straight | Staggered | Curved | $LSD_{(0.10)}$ | Straight | Staggered | Curved | $LSD_{(0.10)}$ |
| Week I | — | — | — | — | — | — | — | — |
| Week II | 5.3 | 5.0 | 6.0 | ns | 7.0 | 5.3 | 5.3 | ns |
| Week III | 6.7 | 6.7 | 6.7 | ns | 7.7 | 8.7 | 7.3 | ns |
| Week IV | 16.7 | 16.0 | 14.7 | ns | 22.0 | 22.7 | 18.0 | ns |

*ns indicates lack of statistical significance at the 0.10 level.

Figure 9:
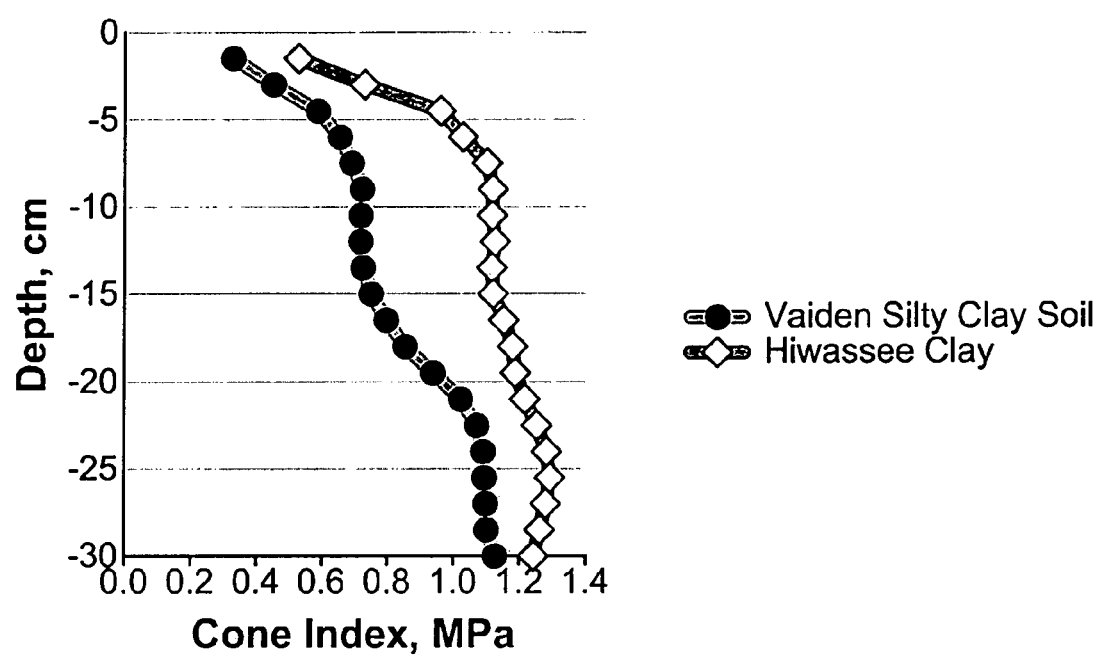
FIG. 9 shows the cone index profile for the Hiwassee clay soil (data shown as solid black circles) and the Vaiden silty clay soil (diamonds).
Figure 10:
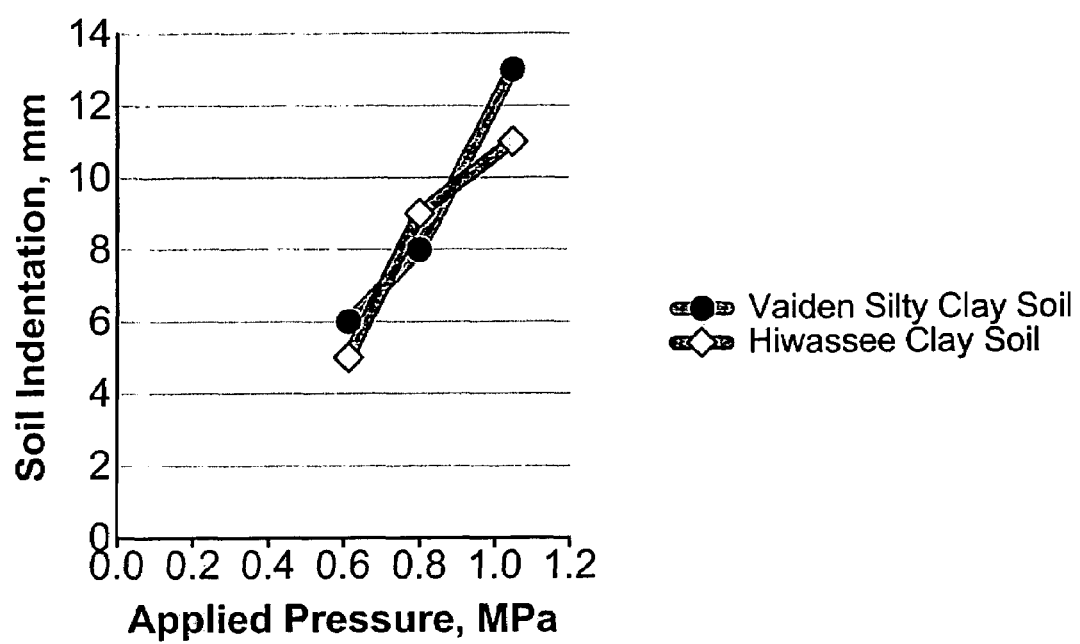
FIG. 10 shows the soil indentations made by the roller of Example 1 in the two soil bins. $LSD_{0.1}$ between soils within treatments=0.6 mm; $LSD_{0.1}$ between treatments within soils= 0.8 mm (data for Hiwassee clay soil shown solid black circles and that for Vaiden silty clay soil shown as diamonds)
Figure 11:
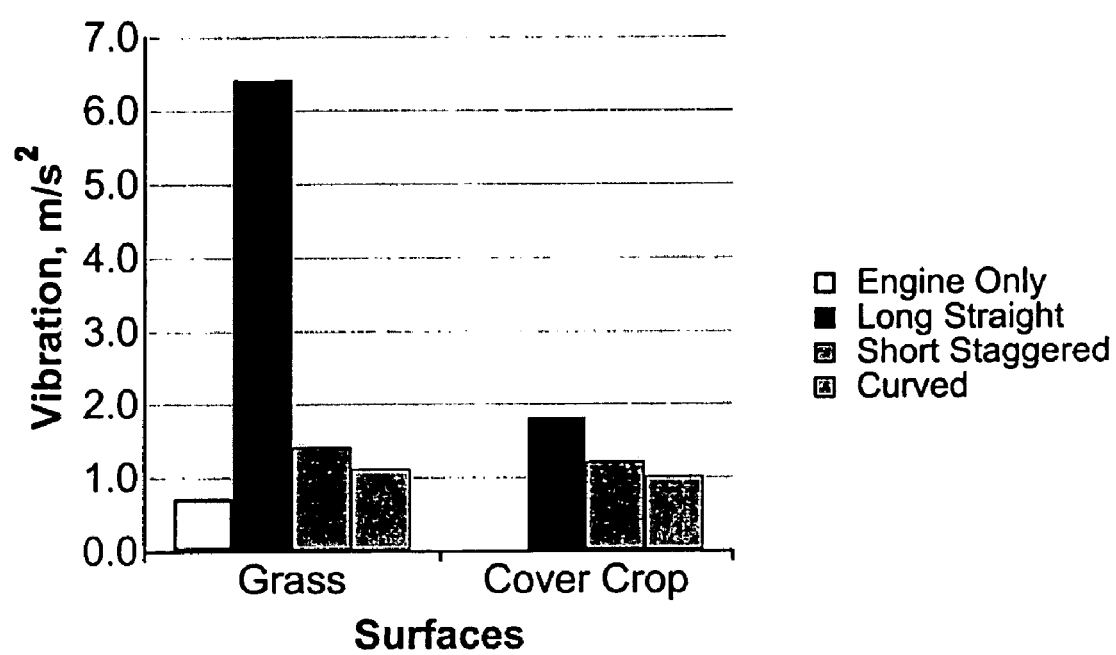
FIG. 11 shows vibration data obtained with the experimental roller in Example 2.

Non-replicated measurements taken with the Quest Technologies Vibration Meter on the Vaiden soil bin showed benefits of using either the curved blade or the short-staggered straight blade arrangement as compared to the long-straight blade arrangement (FIG. 9). A large increase in the vibration level was found using the long-straight blade on a nearby grassed area as compared to using this same blade on the cover crop. This increase in vibration is undoubtedly due to increased soil strength in the grassed area as compared to the Vaiden soil bin which had been previously tilled and contained significant levels of soil moisture.

EXAMPLE 3

The third experiment was conducted to evaluate the different blade systems in the field. This experiment was conducted in the field on a Compass sandy loam soil (thermic Plintic Paleudults) and in a concrete-floored shed at the E. V. Smith Research Station near Shorter, Ala. The experiment consisted of determining vibration information for each of the three blade systems used on the experimental roller used in Experiment 2. These blade systems were: (1) long-straight blades, (2) short-staggered straight blades, and (3) curved blades. Four replications of each blade treatment were conducted on three surfaces: (1) rye cover crop in field, (2) grassed area, and (3) concrete shed floor. The small roller was attached to the JD 4400 tractor and was operated at a constant speed of approximately 1.3 m/s.

A rye cover crop was grown during winter months of 2002 and spring months of 2003. The experiment was conducted in late April 2003 when the rye cover crop was in a late soft dough stage. Measurements of rye cover crop mass were taken on a 0.25-m² plot area immediately after the completion of the experiment as well as weekly measurements of cover crop kill. Measurements of vibration using the Quest Technologies Vibration Meter were also obtained for each blade system on each surface.

Results and Discussion

During the winter months of 2002 and spring months of 2003, the rye cover crop produced 3404 kg/ha. By the time the rolling experiment was conducted in late April of 2003, the cover crop had already started to die. Partly due to this timing and partly due to the success of the blade systems, there were no measurable differences in percent kill for the roller. All blade treatments performed equally well in the field experiment with all achieving a 100% kill within one week after the rolling operation.

TABLE 3

Percent kill for the rye cover crop for Experiment 3.
% Cover Crop Kill

| | Long-Straight Blades | Short-Staggered Straight Blades | Curved Blades | LSD$_{(0.10)}$ |
|---|---|---|---|---|
| Week I | 100 | 100 | 100 | ns |

*ns indicates lack of statistical significance at the 0.10 level.

Figure 6:
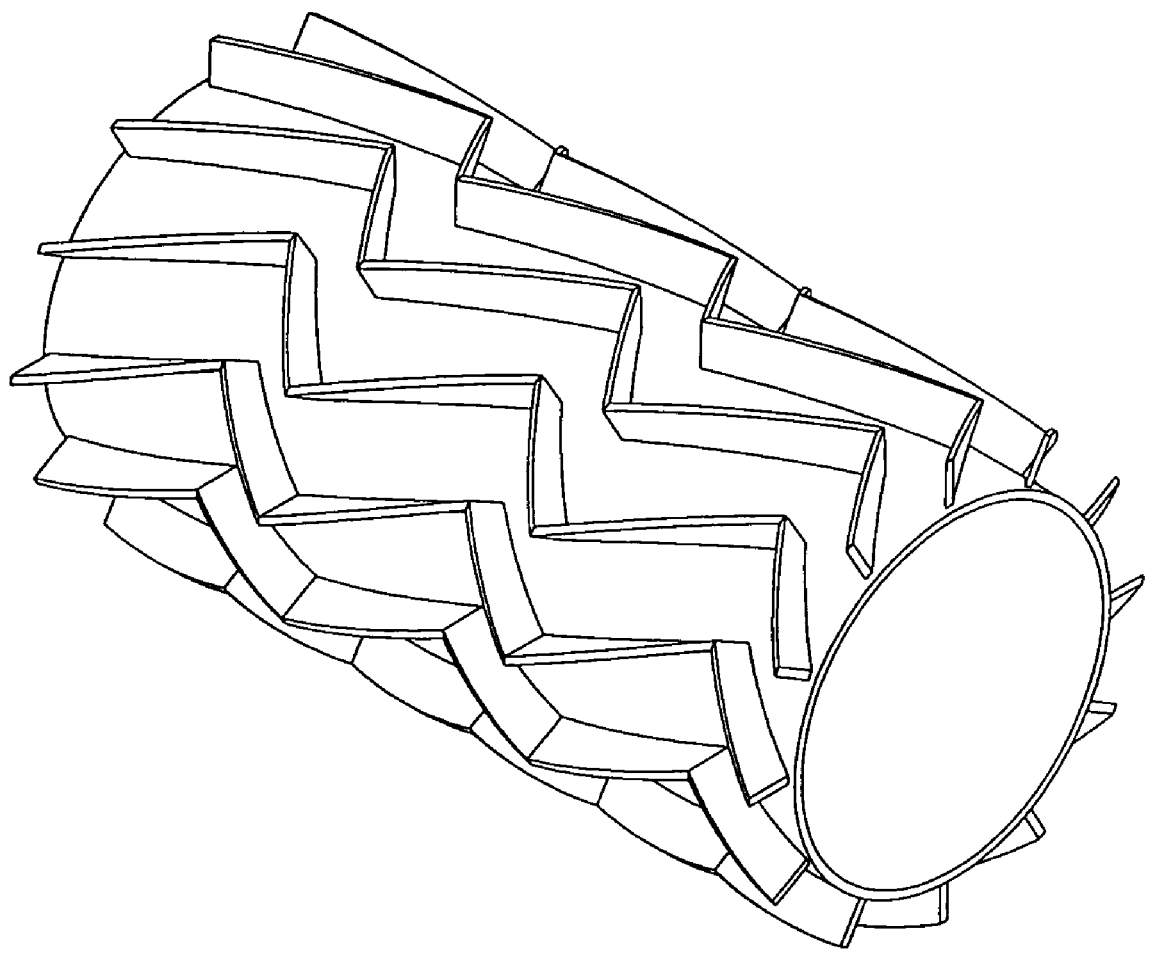
FIG. 6 shows a perspective view of an apparatus having saw-tooth wave shaped blades.

Statistically significant vibration results were found for each of the blade systems on each of the surfaces tested (FIG. 6). As expected, the highest levels of vibration were measured on the concrete floor by all three blade treatments. On the concrete surface, the long-straight blade system recorded the highest value of almost 200 m/s$^2$. The grassed area recorded the next highest vibration values which were statistically greater than those recorded for the rye cover crop area.

The long-straight blade system consistently recorded the maximum values for each surface tested. Although the short-staggered straight blade system recorded statistically higher vibration values as compared to the curved blade system, both of these two treatments were much smaller as opposed to the long-straight blade system for either the grass or cover crop surface.

It is understood that the foregoing detailed description is given merely by way of illustration and that modifications and variations may be made therein without departing from the spirit and scope of the invention.

REFERENCES

ASAE. 1998. Three-point free-link attachment for hitching implement to agricultural wheel tractors. p. 88–91. ASAE Standards. ASAE, St. Joseph, Mich.

ASAE. 1999a. Procedures for obtaining and reporting data with the soil cone penetrometer EP542. p. 964–966. ASAE Standards. ASAE, St. Joseph, Mich.

ASAE. 1999b. Soil cone penetrometer S313.2. p. 808–809. ASAE Standards. ASAE, St. Joseph, Mich.

Ashford, D. L., and D. W. Reeves. 2003. Use of a mechanical roller-crimper as an alternative kill method for cover crops. American Journal of Alternative Agriculture 18(1): 37–45.

CTIC. 2003. Conservation tillage trends 1990–2002. National Crop Residue Management Survey.

Nelson, J. E., K. D. Kephart, A. Bauer, and J. F. Connor. 1995. Growth staging of wheat, barley, and wild oat. University of Missouri Extension Service, 1–20.

Raper, R. L., D. W. Reeves, C. H. Burmester, and E. B. Schwab. 2000a. Tillage depth, tillage timing, and cover crop effects on cotton yield, soil strength, and tillage energy requirements. Applied Eng. Agric. 16(4):379–385.

Raper, R. L., D. W. Reeves, E. B. Schwab, and C. H. Burmester. 2000b. Reducing soil compaction of Tennessee Valley soils in conservation tillage systems. J. Cotton Sci. 4(2):84–90.

Reeves, D. W. 1994. Cover crops and rotations. p. 125–172. In J. L. Hatfield, and B. A. Stewart (ed.) Advances in Soil Science: Crops Residue Management. Lewis Publishers, Boca Raton, Fla.

Vanderlip, R. L., and H. E. Reeves. 1972. Growth stages of sorghum (*Sorghum bicolor* (L.) Moench.). Agron. J. 64(January–February):13–16.

We claim:

1. A method for crimping cover crops comprising:
   a. providing a rolling and crimping apparatus, said apparatus comprising a substantially cylindrical drum having a plurality of rows of outwardly extending blades projecting therefrom, said blades being selected from the group consisting of wave-shaped blades, curved blades, substantially straight discontinuous blades which are substantially parallel to the axis of said drum and extend less than about 80% of the length of said drum, blades paired with a plurality of spaced apart outwardly extending rings projecting from said drum, and combinations thereof; and
   b. rolling said rolling and crimping apparatus across a field having a cover crop thereon such that said cylinder rolls over said crop and said blades contact and crimp the stalks of said crop effective to kill said crop, and wherein said cover crop is a grass.

2. The method of claim 1 wherein said blades contact said stalks of said crop with a force of greater than or equal to about 50 pounds per square inch.

3. The method of claim 1 wherein said blades are wave-shaped blades.

4. The method of claim 3 wherein said wave-shaped blades are selected from the group consisting of sine waves, square waves, triangular waves, and saw-tooth waves.

5. The method of claim 3 wherein said wave-shaped blades are continuous.

6. The method of claim 3 wherein said wave-shaped blades are discontinuous.

7. The method of claim 1 wherein said blades are curved blades.

8. The method of claim 7 wherein said curved blades are helical.

9. The method of claim 4 wherein said curved blades are coil shaped.

10. The method of claim 1 wherein said blades are substantially straight, discontinuous blades.

11. The method of claim 10 wherein said substantially straight, discontinuous blades are staggered with succeeding rows offset from the preceding row.

12. The method of claim 1 wherein said blades are paired with a plurality of spaced apart outwardly extending rings projecting from said drum.

13. The method of claim 1 wherein adjacent rows of said blades are spaced between about 6 to 12 inches apart, measured along the diameter of said cylindrical drum.

14. The method of claim 1 wherein said grass is selected from the group consisting of sorghum sudan-grass, rye, and wheat.

15. The method of claim 1 wherein said grass is rolled with said rolling and crimping apparatus after said grass has matured.

16. The method of claim 15 wherein said grass is rolled with said rolling and crimping apparatus when said grass is at a soft-dough stage.

17. The method of claim 1 wherein said grass is rolled with said rolling and crimping apparatus after said grass is at a anthesis stage.

18. The method of claim 1 wherein said grass is rolled with said rolling and crimping apparatus after said grass is at a flag-leaf stage.

19. The method of claim 2 wherein said blades contact said stalks of said crop with a force of greater than or equal to about 50 pounds per square inch, but less than 100 pounds per square inch.

20. The method of claim 19 wherein said force is sufficient to permanently crimp the stalks of said grass without severing said stalks.

21. In a method for crimping crops wherein a rolling and crimping apparatus is rolled over a grass cover crop in the field, which said apparatus comprises a substantially cylindrical drum having a plurality of rows of outwardly extending blades projecting therefrom such that as cylinder rolls over said grass cover crop said blades contact and crimp the stalks of said crop effective to kill said crop, wherein the improvement comprises said blades being selected from the group consisting of wave-shaped blades, curved blades, substantially straight discontinuous blades which are substantially parallel to the axis of said drum and extend less than about 80% of the length of said drum, blades paired with a plurality of spaced apart outwardly extending rings projecting from said drum, and combinations thereof.

* * * * *